United States Patent [19]

Morley

[11] Patent Number: 4,655,567

[45] Date of Patent: Apr. 7, 1987

[54] REMOTELY MANIPULATABLE PANNING AND TILTING MOUNT FOR VIDEO CAMERAS AND THE LIKE AND METHOD OF MANIPULATING A CAMERA

[76] Inventor: John D. Morley, 4821 Westgate St., Bay City, Mich. 48706

[21] Appl. No.: 837,188

[22] Filed: Mar. 7, 1986

[51] Int. Cl.$^4$ .................. G03B 17/00; G03B 21/00
[52] U.S. Cl. ..................... 352/243; 248/183; 362/66; 354/81; 354/293
[58] Field of Search ............. 352/243, 69; 248/183; 362/66; 354/81, 293

[56] References Cited

U.S. PATENT DOCUMENTS

| | | | |
|---|---|---|---|
| 1,787,309 | 12/1930 | Goldbeck | 352/243 |
| 1,945,112 | 1/1934 | Hogan | 352/69 |
| 2,464,069 | 3/1949 | Barker | 354/81 |
| 3,164,838 | 1/1965 | Heinrich | 352/243 |
| 3,437,753 | 4/1969 | Stith | 352/243 |
| 4,233,634 | 11/1980 | Adams | 352/243 |
| 4,419,721 | 12/1983 | Gregoire et al. | 352/66 |

*Primary Examiner*—Monroe H. Hayes
*Attorney, Agent, or Firm*—Learman & McCulloch

[57] ABSTRACT

A remotely manipulatable, battery operable, panning and tilting camera mount is carried by a mount base for vertical swinging movement which tilts the camera. A vertical sleeve rotatable below the mount is connected with a first motor which rotates it selectively in either direction. The mount base is carried by the sleeve to rotate with it, and pan the camera. A shaft connected with a second motor is received by the sleeve and can extend upwardly through the sleeve and mount base to engage the mount and push it upwardly to accomplish tilting.

5 Claims, 3 Drawing Figures

REMOTELY MANIPULATABLE PANNING AND TILTING MOUNT FOR VIDEO CAMERAS AND THE LIKE AND METHOD OF MANIPULATING A CAMERA

BACKGROUND OF THE INVENTION

This invention relates generally to camera mounts for video cameras and the like, and more particularly to a remotely manipulatable, panning and tilting mount assembly which can be supported on a suitable tripod, or other level support surface. Various camera mounts for supporting a camera from diverse support surfaces are disclosed in the following patents, but are of a complex and costly nature:

U.S. Pat. No. 113,267 Crihfield
U.S. Pat. No. 243,497 Braune
U.S. Pat. No. 280,776 Altheide
U.S. Pat. No. 378,430 Carpenter
U.S. Pat. No. 1,457,982 Makower
U.S. Pat. No. 2,354,515 Greenwood
U.S. Pat. No. 2,516,068 Hash
U.S. Pat. No. 2,551,180 Starr et al
U.S. Pat. No. 2,582,779 Hoge
U.S. Pat. No. 2,725,783 Jackson
U.S. Pat. No. 2,810,819 Gibson
U.S. Pat. No. 2,837,222 Trautman et al
U.S. Pat. No. 2,932,478 Krieger
U.S. Pat. No. 3,164,838 Heinrich
U.S. Pat. No. 3,703,999 Forys et al
U.S. Pat. No. 4,295,621 Siryj
U.S. Pat. No. 4,420,238 Felix Particularly with the advent of video cameras, there is a need for a relatively simple, compact, and reliable camera mount which the user can readily energize to pan or tilt, and to do so simultaneously, or do so from any desired position, at desired speeds.

SUMMARY OF THE INVENTION

The present invention contemplates the provision of a vertical sleeve mounted for rotation by a frame. A mount base is carried by the sleeve for rotation with the sleeve in a horizontal plane, and has a vertical opening through which the sleeve extends. A camera mount is pivotally carried by the mount base off axis from the sleeve, for pivotal swinging movement vertically about a horizontal axis, and a vertically reciprocable shaft is received by the sleeve for rotation therein, and has an upper end which is extendible vertically up through the sleeve to engage the camera mount, and move it upwardly about its horizontal axis of rotation. With motors separately and selectively driving the sleeve and the shaft, the camera mount can be tilted vertically from any position of rotation of the mount base.

One of the prime objects of the present invention is to provide a relatively uncomplicated, compact video camera mount which is of greatly simplified design, and can be manufactured very economically.

A further object of the invention is to provide a video camera mount which, on command, will scan right or left, and move up or down.

A further object of the invention is to provide an efficient and reliable battery operated video camera mount for the home video market which will enable the user to film in a more sophisticated manner and obtain much better results.

Another object of the invention is to provide a camera mount which will enable the cinematographer to change subjects from positions removed from the camera.

Other objects and advantages of the invention will become apparent by reference to the following specification and to the drawings.

IN THE DRAWINGS

Figure 1:
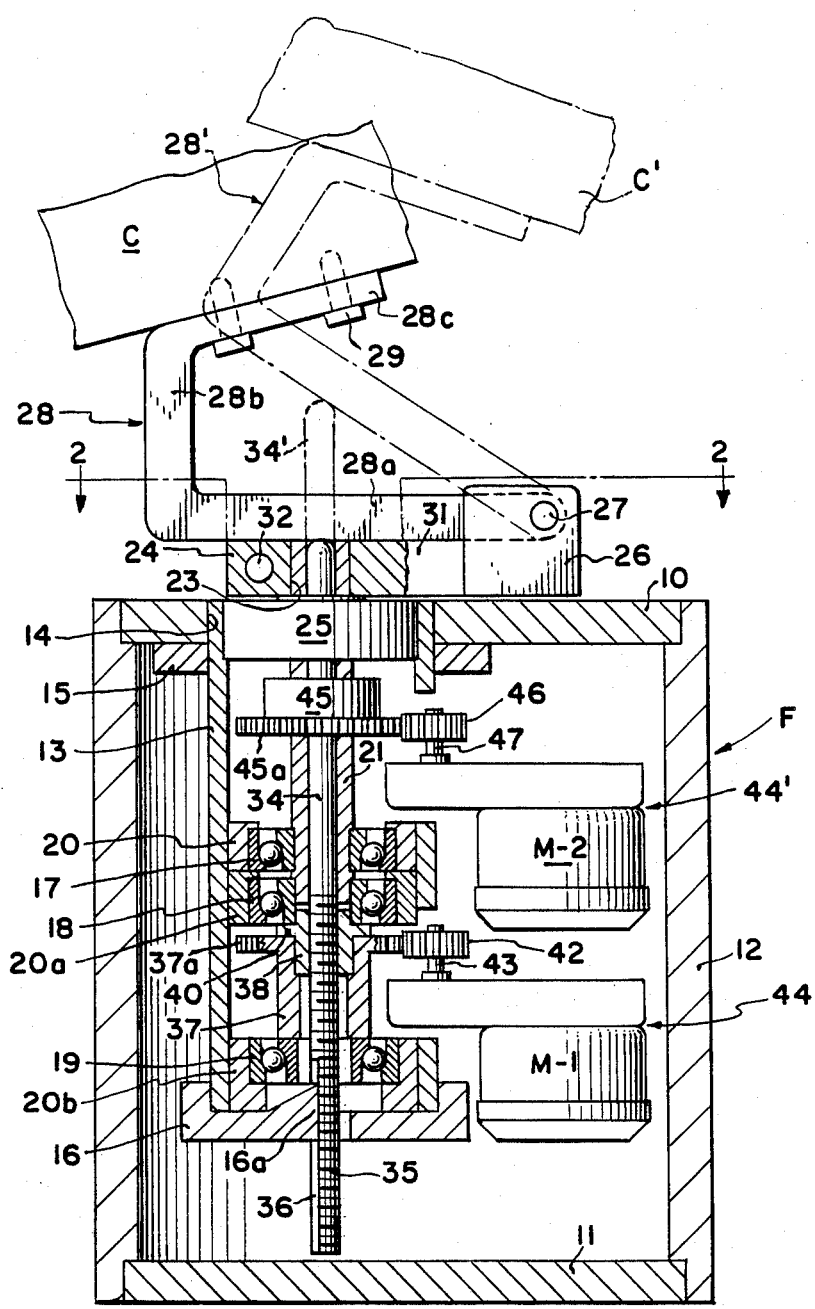
FIG. 1 is a sectional, elevational view of my improved camera mount, the chain lines indicating an elevated position of the video camera.

Referring now more particularly to the accompanying drawings, wherein I have shown only a preferred embodiment of the invention, the housing or frame F is disclosed as including top and bottom walls 10 and 11, and side wall 12. Stationarily provided in the housing 10 is a bearing sleeve 13, which extends upwardly through an opening 14, provided in top wall 10. Sleeve 13 is mounted by support members 15 and 16, fixed to the frame F in any suitable manner. Fixedly supported by the sleeve 13 are roller bearing assemblies 17, 18 and 19, via support rings 20, 20a and 20b. Supported by the inner races of bearing assemblies 17 and 18 is a rotatable sleeve 21, whose upper end extends upwardly through an opening 23, provided in a camera mount base assembly 24. A bearing 25, fixed by sleeve 13, rotatably journals the upper end of the sleeve 21.

Figure 2:
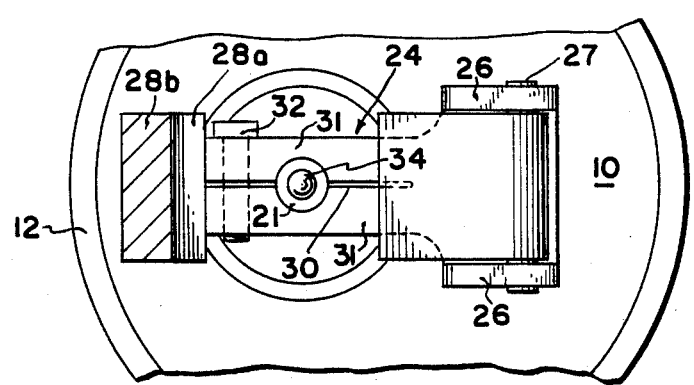
FIG. 2 is a fragmentary, sectional, top plan view, taken on the line 2—2 of FIG. 1.

As FIG. 2 particularly indicates, mount base assembly 24 comprises a base plate 24a, having a pair of upstanding ears 26, providing a clevis for a pin 27 which pivotally supports a camera mount generally designated 28 for vertical tilting or swinging movement. The mount 28, when in the position shown in solid lines in FIG. 1, includes a horizontal leg 28a, a vertical leg 28b, and an upwardly inclined leg 28c, to which video camera C is releasably affixed as with suitable threaded securing members 29, or in any other suitable manner. The plate 24a is bifurcated, as by a slot 30, and the legs 31 formed may be clamped by a bolt 32, to fix the assembly 24 to the sleeve 21 for rotation therewith. The base portion 28a of the mount 28 is engaged by sleeve 21 in the FIG. 1 position.

Reciprocable within the sleeve 21 is a shaft 34, which is threaded as at 35, and has a keyway 36 receiving a key portion 16a provided on the support 16. Plainly, shaft 34, is in this manner, prevented from rotating, but is free to move axially except as restricted by the confines of the keyway 36. Mounted for rotation independently of sleeve 21 on the inner race of bearing assembly 20a, is the hub 37 of a gear 37a which is shouldered to receive a nut 38, which is permitted to rotate, but prevented from moving axially. Nut 38 is internally threaded to receive the threaded portion 35 of shaft 34. At its upper end a flange 40 on nut 38 engages the inner race of bearing assembly 18, and is restrained thereby from moving axially upwardly.

Provided to drive the spur gear 37a, which is keyed to the nut 38 to rotate the nut, is a drive gear 42, mounted on the output shaft 43 of a motor drive assembly 44. The motor M-1 for this assembly is a reversible electric motor and the assembly 44 provides a variable speed drive so that gear 42 can be driven at a desired speed of rotation, and in a desired direction of rotation.

Provided to drive a gear 45, which has its hub 45a fixed to sleeve 21, is a spur gear 46, mounted on the output shaft 47 of a motor drive assembly 44'. The motor M-2 of this assembly is a similar reversible electric motor and the assembly 44' is similarly capable of driving the gear 46 at desired speeds of rotation, and in either direction of rotation.

Figure 3:
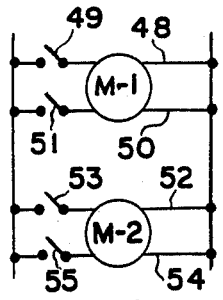
FIG. 3 is a schematic, electrical diagram.

As FIG. 3 indicates, the motors M-1 and M-2 are independently, selectively drivable, and circuit wire 48 which energizes rotation of the motor M-1 shaft in one direction of rotation, is controlled by a manually actuable switch 49. Circuit line 50, which controls energization of the motor M-1 to drive it in the opposite direction, includes the manually actuable switch 51. Circuit line 52, which initiates energization of the motor M-2 to drive it in one direction of rotation, includes the manually operated switch 53 and circuit line 54, which initiates energization of the motor M-2 to drive it in the opposite direction of rotation, is controlled by the manually operable switch 55.

THE OPERATION

To provide for panning movement of the camera C, motor M-2 is operated to revolve sleeve 21 in a direction of rotation appropriate to move the mount 24 either left or right. To provide vertical tilting movement of the camera C, as to the position C' for example, motor M-1 is operated to revolve the nut 38 in a direction to cause the shaft 34 to extend to the broken line position, shown at 34' and push the mount 28 to the 28' position. Actuation of the motor M-1 to move the shaft 34 downwardly, permits gravity forces to restore the mount member 28 to the extent of the projection of shaft 34 from the sleeve 21. Thus panning and tilting is readily accomplishable in a most expeditious and easily controlled manner.

While one embodiment of the invention has been described in detail, it will be apparent to those skilled in the art that the disclosed embodiment may be modified. Therefore, the foregoing description in all aspects is to be considered exemplary rather than limiting in any way, and the true scope of the invention is that defined in the following claims.

What is claimed is:

1. A remotely manipulatable panning and tilting camera assembly for video cameras and the like comprising:
   a. a motor housing;
   b. vertically extending bearing means supported within the housing;
   c. a vertically extending sleeve rotatably supported by said bearing means;
   d. first electric motor means supported within said housing and having motor drive transmission mechanism coupled to said sleeve to rotate it selectively in opposite directions;
   e. a mount base carried by said sleeve for rotation therewith above the housing in a horizontal plane and having a horizontal axis pivot thereon spaced horizontally from said sleeve, said housing having a vertical opening through which said sleeve extends;
   f. a camera mount above said mount base having vertically spaced upper and lower portions, the upper portion having camera securing means for releasably securing a camera thereto, the lower portion being pivotally carried by said mount base pivot for pivotal swinging movement vertically about said horizontal axis pivot;
   g. a threaded shaft received by said sleeve for rotation therein having an upper end extendable vertically up through said sleeve to engage the lower portion of said camera mount and move it upwardly about said axis;
   h. nut means, restricted from moving vertically, mounted for rotation relative to said shaft by said housing; and
   i. second electric motor means supported within the housing energizable independently of said first motor means for driving said nut means selectively in either direction of rotation to move said shaft and swing said camera mount upwardly or permit it to return downwardly.

2. The mount as set forth in claim 1 wherein said nut means comprises a nut mounted coaxially below said sleeve.

3. The mount as set forth in claim 1 wherein said first and second motor means are supported by the housing in vertically stacked relation.

4. A remotely manipulatable mount assembly for video cameras and the like comprising:
   a. a motor housing;
   b. vertically extending sleeve means having an axis of rotation and rotatably supported by said housing;
   c. first drive motor means supported by said housing and coupled to said sleeve means to rotate it selectively opposite directions;
   d. a mount base carried by said sleeve above said housing for rotation therewith in a horizontal plane, the housing having a vertical opening through which said sleeve extends, said mount base having a horizontal axis pivot thereon spaced horizontally from the axis of said sleeve;
   e. a camera;
   f. a camera mount, above said mount base and having camera securing means, pivotally carried by said mount base pivot for pivotal swinging movement vertically about said horizontal axis pivot, and extending to overlie the said housing opening;
   g. shaft means received by said sleeve having an upper end extendable vertically up through said sleeve to engage a lower portion of said camera mount and move said mount upwardly about said pivot as an axis; and
   h. second drive means supported by said housing and energizable independently of said first drive means for moving said shaft means selectively vertically to swing said camera mount upwardly.

5. The invention of claim 4 wherein said camera mount comprises a base, a vertically extending leg, and an upwardly inclined leg extending in a return direction to overlie said base and the said sleeve means.

* * * * *